(12) United States Patent
Yang

(10) Patent No.: US 7,649,706 B2
(45) Date of Patent: Jan. 19, 2010

(54) APPARATUS, MEDIUM, AND METHOD CONTROLLING FLYING HEIGHT OF A MAGNETIC HEAD OF A DISK DRIVE

(75) Inventor: Won-choul Yang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 376 days.

(21) Appl. No.: 11/317,012

(22) Filed: Dec. 27, 2005

(65) Prior Publication Data

US 2006/0139789 A1 Jun. 29, 2006

(30) Foreign Application Priority Data

Dec. 28, 2004 (KR) ............ 10-2004-0113692

(51) Int. Cl.
*G11B 21/02* (2006.01)
*G11B 27/36* (2006.01)
(52) U.S. Cl. .......................... 360/75; 360/31
(58) Field of Classification Search ............... None
See application file for complete search history.

(56) References Cited

U.S. PATENT DOCUMENTS

| 5,959,801 | A | 9/1999 | Gillis et al. | |
|---|---|---|---|---|
| 6,972,919 | B2 * | 12/2005 | Suk ............. | 360/75 |
| 6,975,472 | B2 * | 12/2005 | Stover et al. ........ | 360/59 |
| 6,975,475 | B2 * | 12/2005 | Lee et al. ........... | 360/68 |
| 7,061,706 | B2 * | 6/2006 | Conteras et al. ....... | 360/75 |
| 7,312,944 | B2 * | 12/2007 | Takahashi et al. ...... | 360/75 |
| 7,400,473 | B1 * | 7/2008 | Krajnovich et al. ..... | 360/294.7 |
| 2002/0114108 | A1 | 8/2002 | Bement et al. | |
| 2002/0122268 | A1 | 9/2002 | Bement et al. | |
| 2002/0191326 | A1 | 12/2002 | Xu et al. | |
| 2003/0099054 | A1 | 5/2003 | Kamijima | |
| 2003/0174430 | A1 | 9/2003 | Takahashi et al. | |
| 2004/0060167 | A1 | 4/2004 | Wang et al. | |
| 2004/0114268 | A1 | 6/2004 | Satoh et al. | |

FOREIGN PATENT DOCUMENTS

JP 2000-348456 12/2000
KR 10-2004-0052031 6/2004

OTHER PUBLICATIONS

European Search Report, dated Aug. 29, 2006, and issued in related European Patent Application No. 05028607.9-2210.

* cited by examiner

*Primary Examiner*—K. Wong
(74) *Attorney, Agent, or Firm*—Staas & Halsey LLP

(57) ABSTRACT

Provided is an apparatus, medium, and method controlling a flying height of a magnetic head of a disk drive so that a clearance between a disk and the magnetic head in a data write mode can be similar, e.g., substantially the same, as that of the magnetic head in a data read mode. The apparatus may includes a disk storing information, a magnetic head including a magnetic read element detecting a magnetic field on the disk, a magnetic write element magnetizing a portion of the disk, a structure generating an air bearing between a surface of the disk and the magnetic read element and magnetic write element, and a heater heating the structure that generates the air bearing, and a current supply circuit supplying current to the heater so that a clearance between the disk and the magnetic head in a write mode can be similar, e.g., substantially the same, as that of the magnetic head in a read mode.

17 Claims, 7 Drawing Sheets

APPARATUS, MEDIUM, AND METHOD CONTROLLING FLYING HEIGHT OF A MAGNETIC HEAD OF A DISK DRIVE

CROSS-REFERENCE TO RELATED APPLICATIONS

This application claims the priority benefit of Korean Patent Application No. 10-2004-0113692, filed on Dec. 28, 2004, in the Korean Intellectual Property Office, the disclosure of which is incorporated herein in its entirety by reference.

BACKGROUND OF THE INVENTION

1. Field of the Invention

Embodiments of the present invention relate to an apparatus, medium, and method controlling a disk drive, and more particularly, to an apparatus, medium, and method for controlling a flying height of a magnetic head of a disk drive so that a clearance between a disk and the magnetic head in a data write mode is similar, e.g., substantially the same, as that of the magnetic head in a data read mode.

2. Description of the Related Art

Conventionally, as in U.S. Patent Publication No. 2002-122268, a shape memory alloy has been used to prevent a head and a disk from contacting each other due to a thermal pole tip protrusion during a temperature rise. Similarly, Korean Patent Publication No. 2004-52031 discusses the controlling of a write current by measuring the thermal pole tip protrusion of a magnetic head.

Here, in general, disk drives, such as hard disk drives (HDDs), which can be data storage devices for computer systems, typically reproduce and/or write data on a disk using a magnetic head. Due to the recent trend of high capacity, high density, and compact HDDs, there has been a corresponding increase in bit density in a tangential direction measured in bits-per-inch (BPI) and track density in a radial direction measured in tracks-per-inch (TPI), thereby requiring more delicate operations relative to the control of the HDDs.

A magnetic write head of an HDD may be made of a metal material, and a slider supporting the magnetic head may be made of a non-metal material. When a write current flows through a coil, during a data write operation, heat is generated according to Joule's law. At this time, a pole area expands due to a thermal expansion coefficient difference between the metal material and the non-metal material, which has been referred to as thermal pole tip protrusion (TPTP). Due to the TPTP, there is a reduction in the flying height of the head, that is, a clearance between the head and a disk.

Accordingly, the flying height of the magnetic head in a write mode is different from a flying height of the magnetic head in a read mode. Consequently, servo pattern signals reproduced in the write mode and the read mode have different magnitudes, thereby affecting the servo control performance of the HDD. Also, since the thermal pole tip protrusion does not occur perfectly during a starting point of the write operation, write errors may occur, and more frequently at low temperatures.

SUMMARY OF THE INVENTION

Embodiments of the present invention include at least an apparatus, medium, and method controlling a flying height of a magnetic head of a disk drive to operate similarly, e.g., to be substantially the same, both in a write mode and a read mode by adding a heater to the magnetic head and adjusting current flowing through the heater.

To achieve the above and/or other aspects and advantages, embodiments of the present invention include an apparatus controlling a flying height of a magnetic head of a recording and/or reproducing apparatus, the apparatus including a medium storing information, the magnetic head including a magnetic read element to detect a magnetic field in a portion of the medium, a magnetic write element to magnetize a portion of the medium, a structure to generate an air bearing between a surface of the medium and the magnetic read element and magnetic write element, and a heater particularly heating the structure that generates the air bearing, and a current supply circuit supplying current to the heater, wherein the current is designated such that a clearance between the medium and the magnetic head in a write mode is substantially the same as a clearance between the medium and the magnetic hard in a read mode.

The heater may include a coil.

Current supplied to the heater may be designated to correspond to a target clearance between the medium and the magnetic head in both the write mode and the read mode by selectively controlling the current supplied to the heater in each of the read mode and the write mode and obtaining data representing a relationship between power of the heater and a clearance between the medium and the magnetic head.

The apparatus may further perform a process of obtaining the data representing the relationship between the power of the heater and the clearance between the medium and the magnetic head in the read mode, and the process includes detecting a linear velocity and a recording frequency in a predetermined test track of the medium, performing a data read mode in the test track, detecting a gain value of an automatic gain control circuit with respect to a signal reproduced when current supplied to the heater is increased by a predetermined amount until the magnetic head and the medium contact each other, obtaining the data representing the relationship between the power of the heater and the clearance between the medium and the magnetic head based on:

$\Delta d = (\lambda/2\pi) * Ls$, where $\Delta d$=variation of magnetic space between the medium and magnetic head, $\lambda$=recording wavelength=linear velocity/recording frequency, $Ls = Ln(TAA1/TAA2)$, TAA1=previous automatic gain control (AGC) gain value, and TAA2=present AGC gain value, and obtaining a power from the data representing the relationship between the power of the heater and the clearance between the medium and the magnetic head, the power corresponding to a target clearance between the medium and the magnetic head and determining from the obtained power the current supplied to the heater in the read mode.

If a position error signal is detected and a level of the position error signal exceeds a predetermined threshold value, the magnetic head is determined to have contacted the medium.

The apparatus may performs a process of obtaining the data representing the relationship between the power of the heater and the clearance between the medium and the magnetic head in the write mode, and the process includes detecting a linear velocity and a recording frequency in a predetermined test track of the medium, performing a data write mode in the test track, detecting a gain value of an automatic gain control circuit with respect to a signal reproduced when current supplied to the heater is increased by a predetermined amount until the magnetic head and the medium contact each other, obtaining the data representing the relationship between the power of the heater and the clearance between the medium and the magnetic head based on:

$\Delta d=(\lambda/2\pi)*Ls$, where $\Delta d$=variation of magnetic space between the medium and magnetic head, $\lambda$=recording wavelength=linear velocity/recording frequency, Ls=Ln (TAA1/TAA2), TAA1=previous AGC gain value, and TAA2=present AGC gain value, and obtaining a power from the data representing the relationship between the power of the heater and the clearance between the medium and the magnetic head, the power corresponding to a target clearance between the medium and the magnetic head and determining from the obtained power the current supplied to the heater in the write mode.

The apparatus controlling the flying height of the magnetic head may be the recording and/or reproducing apparatus, and may further include a spindle motor to rotate the medium, with the recording and/or reproducing apparatus being a hard disk drive.

To achieve the above and/or other aspects and advantages, embodiments of the present invention include a method of controlling a flying height of a magnetic head, the magnetic head including a heater, the method including obtaining data representing a relationship between power of the heater and a clearance between a medium and the magnetic head by varying current supplied to the heater in each of a write mode and a read mode of the magnetic head, and determining, from the data representing the relationship, current to be supplied to the heater in the write mode and current supplied to the heater in the read mode, both supplied currents corresponding to a target clearance between the medium and the magnetic head.

The obtaining of the data representing the relationship between the power of the heater and the clearance between the medium and the magnetic head in the read mode may include detecting a linear velocity and a recording frequency in a predetermined test track of the medium, performing a data read mode in the test track, detecting a gain value of an automatic gain control circuit with respect to a signal reproduced when current supplied to the heater is increased by a predetermined amount until the magnetic head and the medium contact each other, and obtaining data representing the relationship between the power of the heater and the clearance between the medium and the magnetic head based on:

$\Delta d=(\lambda/2\pi)*Ls$, where $\Delta d$=variation of magnetic space between medium and magnetic head, $\lambda$=recording wavelength =linear velocity/recording frequency, Ls=Ln (TAA1/TAA2), TAA1=previous AGC gain value, and TAA2=present AGC gain value.

If a position error signal is monitored and a level of the position error signal exceeds a predetermined threshold value, the magnetic head may be determined to have contacted the medium.

The obtaining of the data representing the relationship between the power of the heater and the clearance between the medium and the magnetic head in the write mode may include detecting a linear velocity and a recording frequency in a predetermined test track of the medium, performing a data write mode in the test track, detecting a gain value of an automatic gain control circuit with respect to a signal reproduced when current supplied to the heater is increased by a predetermined amount until the magnetic head and the medium contact each other, obtaining the data representing the relationship between the power of the heater and the clearance between the medium and the magnetic head based on:

$\Delta d=(\lambda/2\pi)*Ls$, where $\Delta d$=variation of magnetic space between the medium and magnetic head, $\lambda$=recording wavelength =linear velocity/recording frequency, Ls=Ln (TAA1/TAA2), TAA1=previous AGC gain value, and TAA2=present AGC gain value, and obtaining a power from data representing the relationship between the power of the heater and the clearance between the medium and the magnetic head, the power corresponding to a target clearance between the medium and the magnetic head and determining from the obtained power the current supplied to the heater in the write mode.

In addition, in the method, the medium may be a disk of a hard disk drive.

To achieve the above and/or other aspects and advantages, embodiments of the present invention include at least one medium including computer readable code to implement method embodiments of the present invention.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
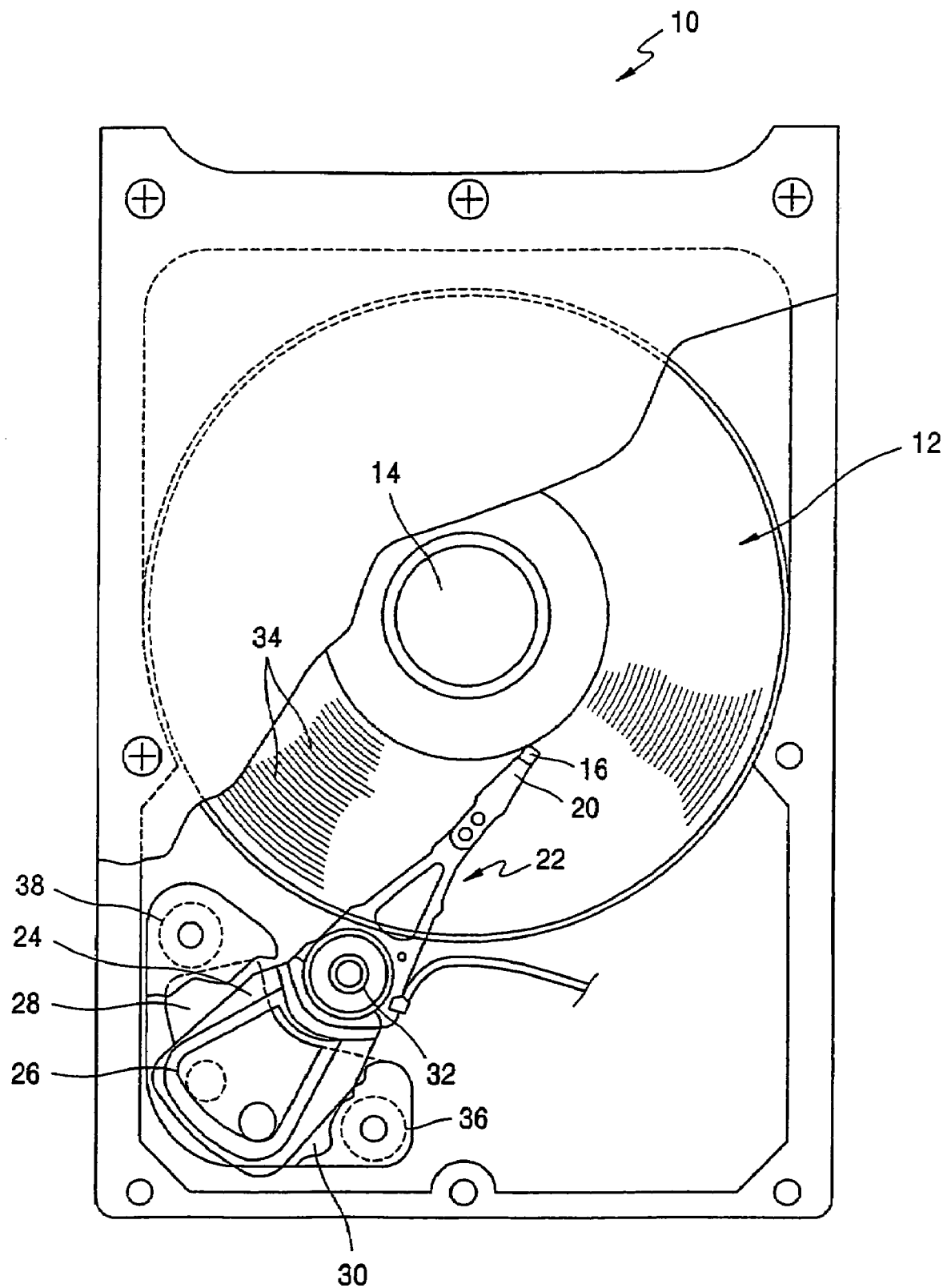
FIG. 1 illustrates a head disk assembly of a disk drive, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

A hard disk drive (HDD) may be made up of a head disk assembly (HDA) including mechanical components, and electric circuits.

According to an embodiment of the present invention, FIG. 1 illustrates an HDA 10 of an HDD, with the HDA 10 including at least one disk 12 that can be rotated by a spindle motor 14, and data can be read/written from/on the disk 12 by a magnetic head 16, e.g., including a transducer, located adjacent to a surface of the disk 12.

The transducer can read or write information on each rotating disk 12 by detecting a magnetic field along a portion the disk 12 or by magnetizing a portion the disk 12. The transducer is typically associated with the surface of the disk 12. Here, although the transducer may be explained as a single unit, it should be understood that the transducer may include a writer transducer for magnetizing the portion of the disk 12 and a reader transducer for detecting the magnetic field of the portion of the disk 12. As an example, the reader transducer may be made up of a magneto-resistive (MR) element.

As noted above, the transducer may be integrated into the magnetic head 16, which may further have a structure that generates an air bearing surface between the transducer and the surface of the disk 12 while the disk 12 is rotating. The magnetic head 16 can be incorporated with a head stack assembly (HSA) 22, with the HSA 22 being attached to an actuator arm 24 that has a voice coil 26. The voice coil 26 may be located adjacent to a magnetic assembly 28, thereby making up a voice coil motor (VCM) 30. A current supplied to the voice coil 26 can generate a torque for rotating the actuator arm 24 about a bearing assembly 32, such that the rotation of the actuator arm 24 may cause the transducer to traverse across the surface of the disk 12.

Information may typically be stored in annular tracks 34 of the disk 12, with each of the tracks 34 generally including a plurality of sectors. Each of the sectors may include a data field and a servo field. Here, the servo field may include a preamble, a servo address/index mark (SAM/SIM), gray code, and burst signals A, B, C, and D, for example. Thus, the transducer can move across the surface of the disk 12 to read or write information in differing tracks.

Figure 2:
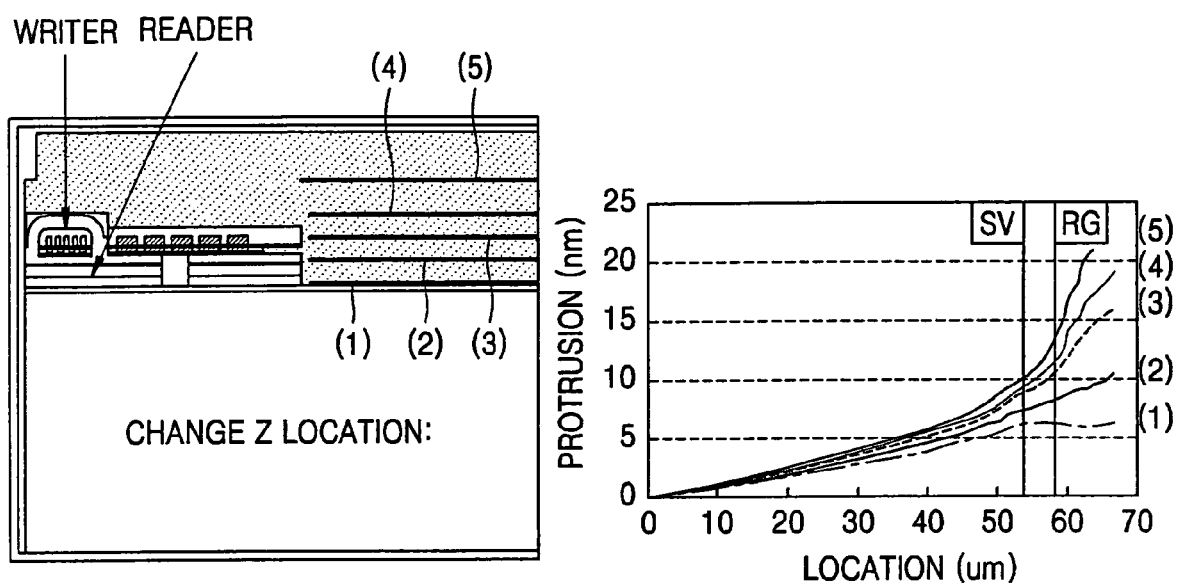
FIG. 2 is a sectional view of a magnetic head explaining a method of determining the position of a heater added to the magnetic head, and a graph illustrating a relationship between the position of the heater and the protrusion of an air bearing surface.

According to an embodiment of the present embodiment, the magnetic head 16 may have a structure that generates an air bearing between the surface of the disk 12 and the reader and writer transducers, and also may include a heater for heating the magnetic head 16 to enable the generation the desired air bearing. As an example, the heater may include a coil. Referring to FIG. 2, the expansion of the surface of the magnetic head 16 that supports the air bearing may be measured by supplying current to the coil of the heater while changing the location Z of the coil of the heater to determine an optimum location of the coil of the heater for optimum expansion conditions. In the graph shown in FIG. 2, the surface of the magnetic head 16 that supports the air bearing is shown to be relatively uniformly expanded in a location 1 between a reader position SV and a writer position RG.

Figure 3:
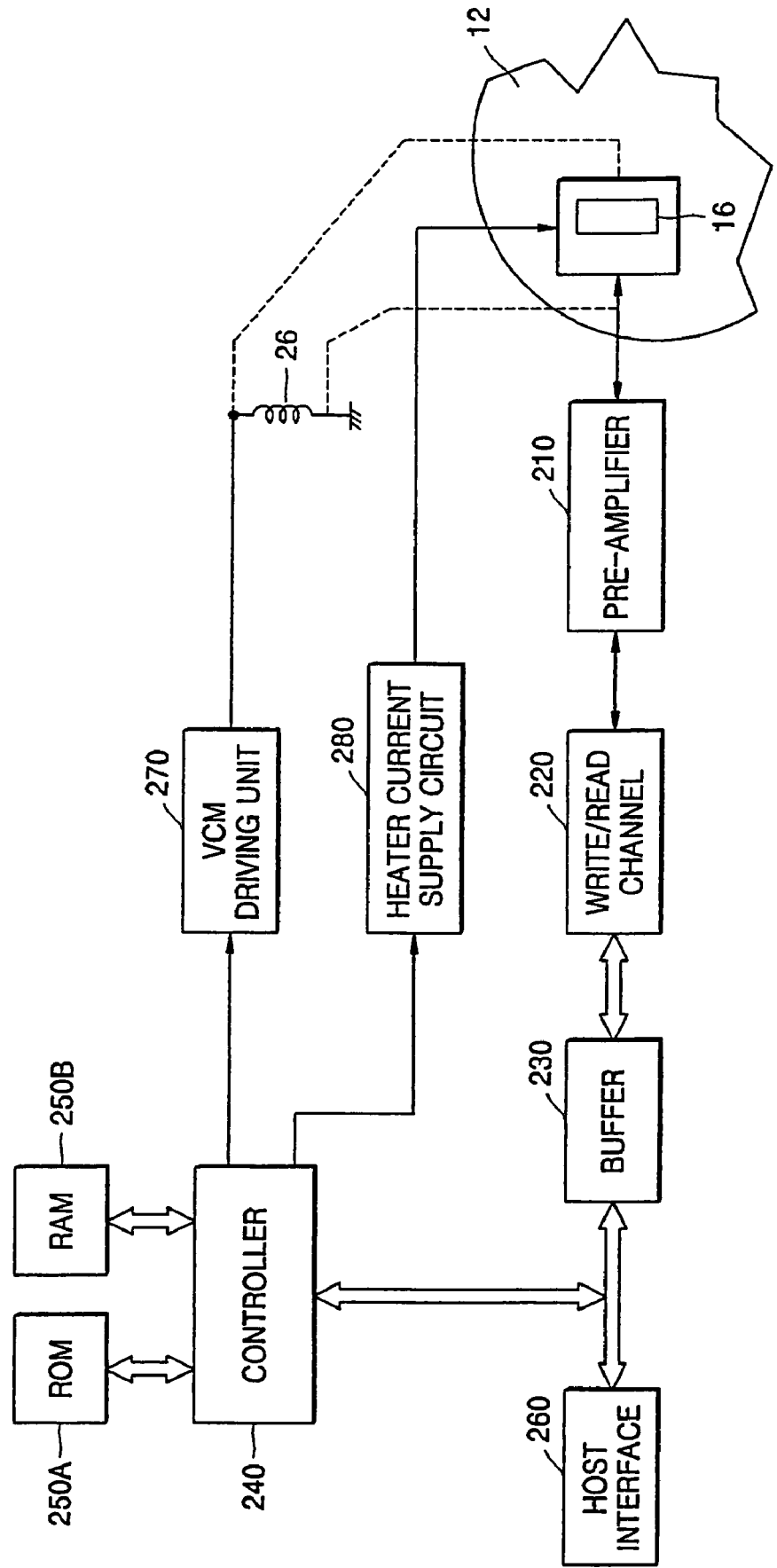
FIG. 3 illustrates an electric circuit configuration of a disk drive, according to an embodiment of the present invention.

Referring to FIG. 3, a disk drive, according to an embodiment of the present invention, includes the disk 12, the magnetic head 16, a pre-amplifier 210, a write/read channel 220, a buffer 230, a controller 240, a read-only memory (ROM) 250A, a random access memory (RAM) 250B, a host interface 260, a VCM driving unit 270, and a heater current supply circuit 280, for example.

Firmware to control aspects of the disk drive and control information may be stored in the ROM 250A, and information for driving the disk drive, which may be read from the ROM 250A or the disk 12 upon the startup of the disk drive, may be stored in the RAM 250B, noting that embodiments of the present invention are not limited thereto.

The controller 240 may analyze a command received from a host device (not shown) via the host interface 260 and perform a control corresponding to the analyzed result. The controller 240 may supply a control signal to the VCM driving circuit 270 to control the excitation of the VCM and the movement of the magnetic head 16.

In the operation of a disk drive, according to an embodiment of the present invention, in a data read mode, the pre-amplifier 210 may amplify an electrical signal detected from the disk 12 by the reader of the magnetic head 16. Then, the write/read channel 220 may amplify the signal amplified by the pre-amplifier 210 to a predetermined level, for example, while an automatic gain control circuit (not shown) controls a gain, encode the analog signal amplified to the predetermined level by the automatic gain control circuit into a digital signal usable by the host device, convert the digital signal into stream data, temporarily store the stream data in the buffer 230, and transmit the stream data to the host device via the host interface 260.

In a write mode, the buffer 230 may temporarily store data that is received from the host device via the host interface 260, the write/read channel 220 may convert the data that is sequentially output from the buffer 230 into a binary data stream suitable for a write channel, the pre-amplifier 210 may amplify a write current, and the writer of the magnetic head 16 may record the data using the amplified write current on the disk 12.

While reproducing a preamble, a servo address/index mark (SAM/SIM), a gray code, and burst signals A, B, C, and D recorded in a servo field, the write/read channel 220 may provide information necessary for the control of track-seek and track-following motions. In particular, the write/read channel 220 can determine a servo gain value of the automatic gain control circuit using the preamble signal.

The heater current supply circuit 280 may supply a current to the heater, installed inside the magnetic head 16. Current supplied to the heater in the read mode may be designated to be different from current supplied to the heater in a write mode so that a clearance between the disk 12 and the magnetic head 16 in the read mode can be similar, e.g., substantially the same, as a clearance between the disk 12 and the magnetic head 16 in the write mode.

An embodiment of the present invention, including a method of designating the current supplied to the heater in each of the write mode and the read mode, will now be explained in greater detail.

Figure 4:
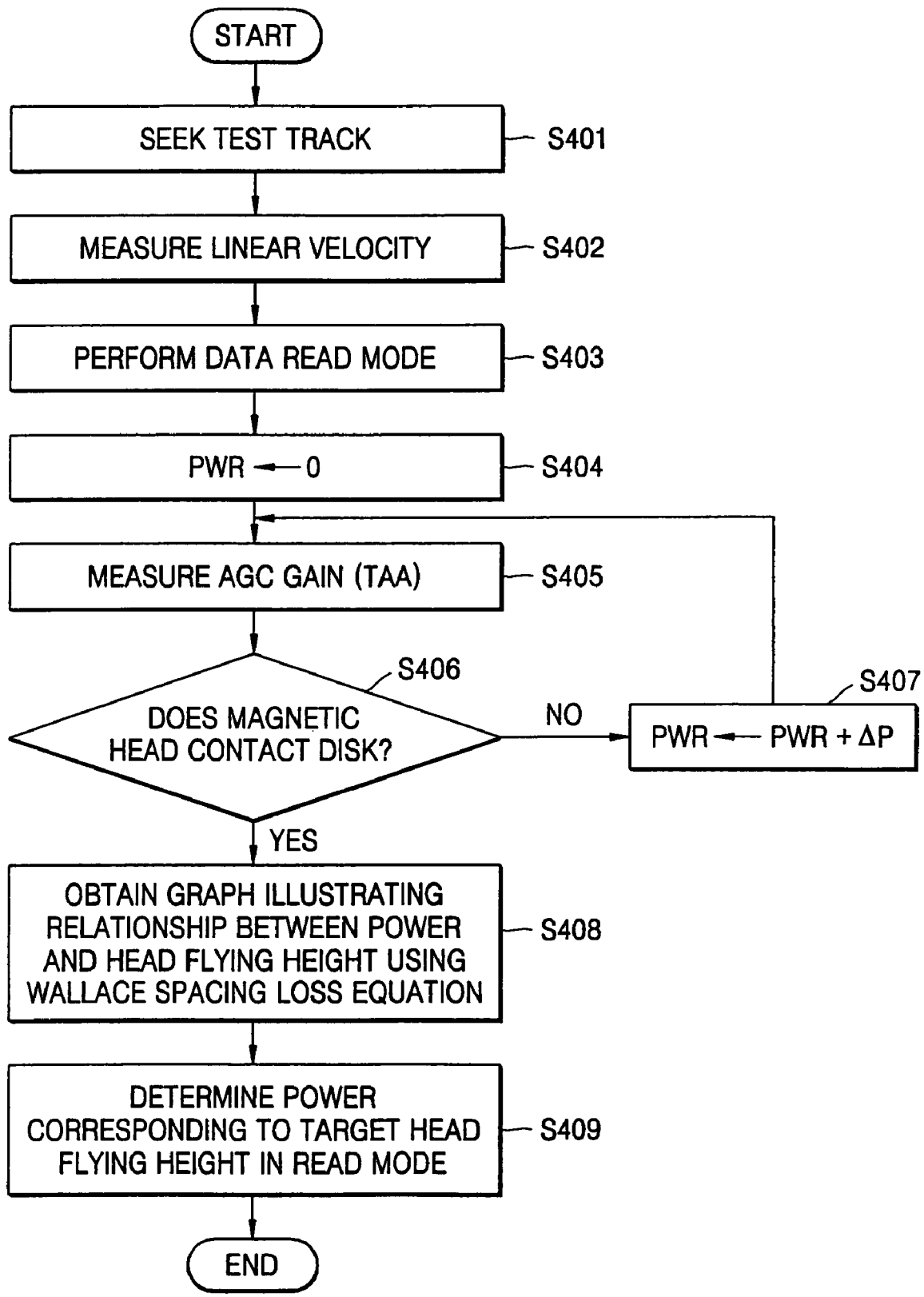
FIG. 4 is a flow chart illustrating a method of determining current supplied to the heater to control a flying height of the magnetic head in a read mode, according to an embodiment of the present invention.

First, an embodiment of the present invention, including a method of designating the current to the heater of the magnetic head 16, to control a flying height of the magnetic head 16 in the read mode, will be explained in greater detail with reference to the flow chart of FIG. 4.

The magnetic head 16 may be moved to a test track on the disk 12 under a track-seek control, in operation S401. A linear velocity in the test track may then, for example, be measured, in operation S402. The linear velocity can be obtained by calculating a time interval between detected servo sectors and dividing a servo sector interval between the servo sectors by the time interval.

A data read mode may be performed in the test track, in operation S403, and the heater current supply circuit 280 may set the current supplied to the heater of the magnetic head 16 to zero (0), for example, in a predetermined period of time, also for example, after the data read mode is implemented such that power PWR of the heater becomes zero (0), in operation S404.

In operation S405, an automatic gain control (AGC) gain value of the automatic gain control circuit of the write/read channel 220 may be measured. Here, the gain value of the automatic gain control circuit is an AGC gain value that may be set when the data field is reproduced or an AGC gain value set when the servo field is reproduced. The present embodiment uses a servo AGC gain value TAA. Whether the magnetic head 16 contacts the disk 12 can be determined, in operation S406. If a position error signal is detected and the level of the position error signal exceeds a threshold value, the magnetic head 16 may be determined to have contacted the disk 12.

If the magnetic head 16 does not contact the disk 12, operation S407 may be performed, where the heater current supply circuit 280 increases the current supplied to the heater of the magnetic head 16 by a predetermined amount, for example, to increase the power PWR by AP, and may perform operation S405 again. Of course, in this case, an AGC gain may be measured in a predetermined period of time after the power of the heater has been increased.

However, if the magnetic head 16 contacts the disk 12, operation S408 may be performed. In operation S408, a graph illustrating a relationship between the power PWR of the heater and a flying height of the magnetic head 16 over the disk 12 may be obtained using the following Wallace spacing loss equation 1, by amplitude.

$\Delta d = (\lambda/2\pi)^* Ls$, where $\Delta d$=variation of magnetic space between the medium and magnetic head, $\lambda$=recording wavelength =linear velocity/recording frequency, $Ls = Ln\ (TAA1/TAA2)$, TAA1=previous AGC gain value, and TAA2=present AGC gain value, where Ln stands for natural logarithm (1)

Accordingly, a relationship between the AGC gain value and the magnetic space between the disk 12 and the magnetic head 16 may be obtained using this equation 1. Since the AGC gain values, according to the variation of the power PWR of the heater, have been measured, a relationship between the power and the magnetic space between the disk 12 and the magnetic head 16 can be obtained. As a result, a graph illustrating a relationship between the power of the heater and a spacing gain corresponding to the flying height of the magnetic head in the read mode can be obtained, as illustrated in FIG. 6.

Figure 6:
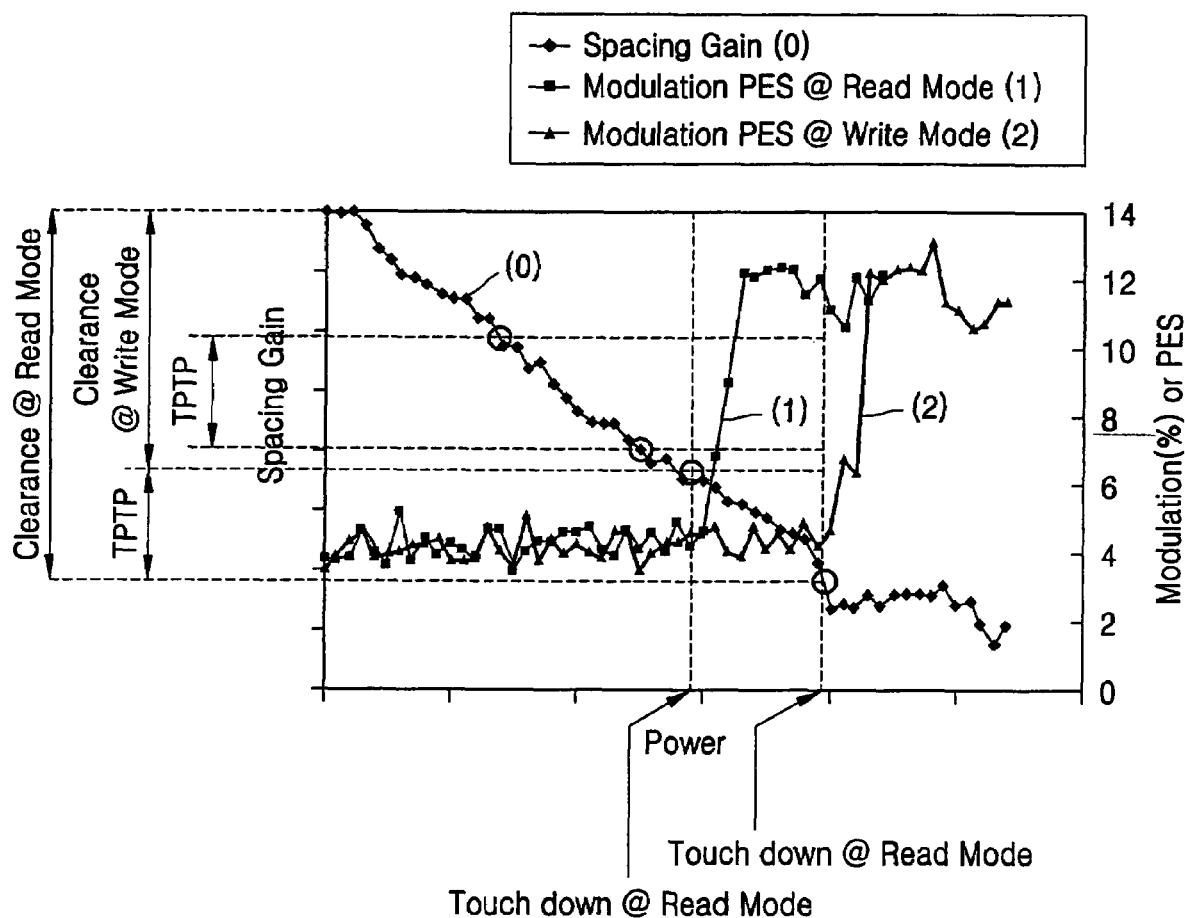
FIG. 6 illustrates a relationship between heater power and a spacing gain corresponding to the flying height of a magnetic head in a read mode and a write mode, according to an embodiment of the present invention.

In operation S409, the power PWR of the heater, corresponding to a target flying height of the magnetic head in the read mode, may be determined, e.g., from the graph of FIG. 6, and the current supplied to the heater of the magnetic head 16 in the read mode may be determined based on the determined power PWR.

Figure 5:
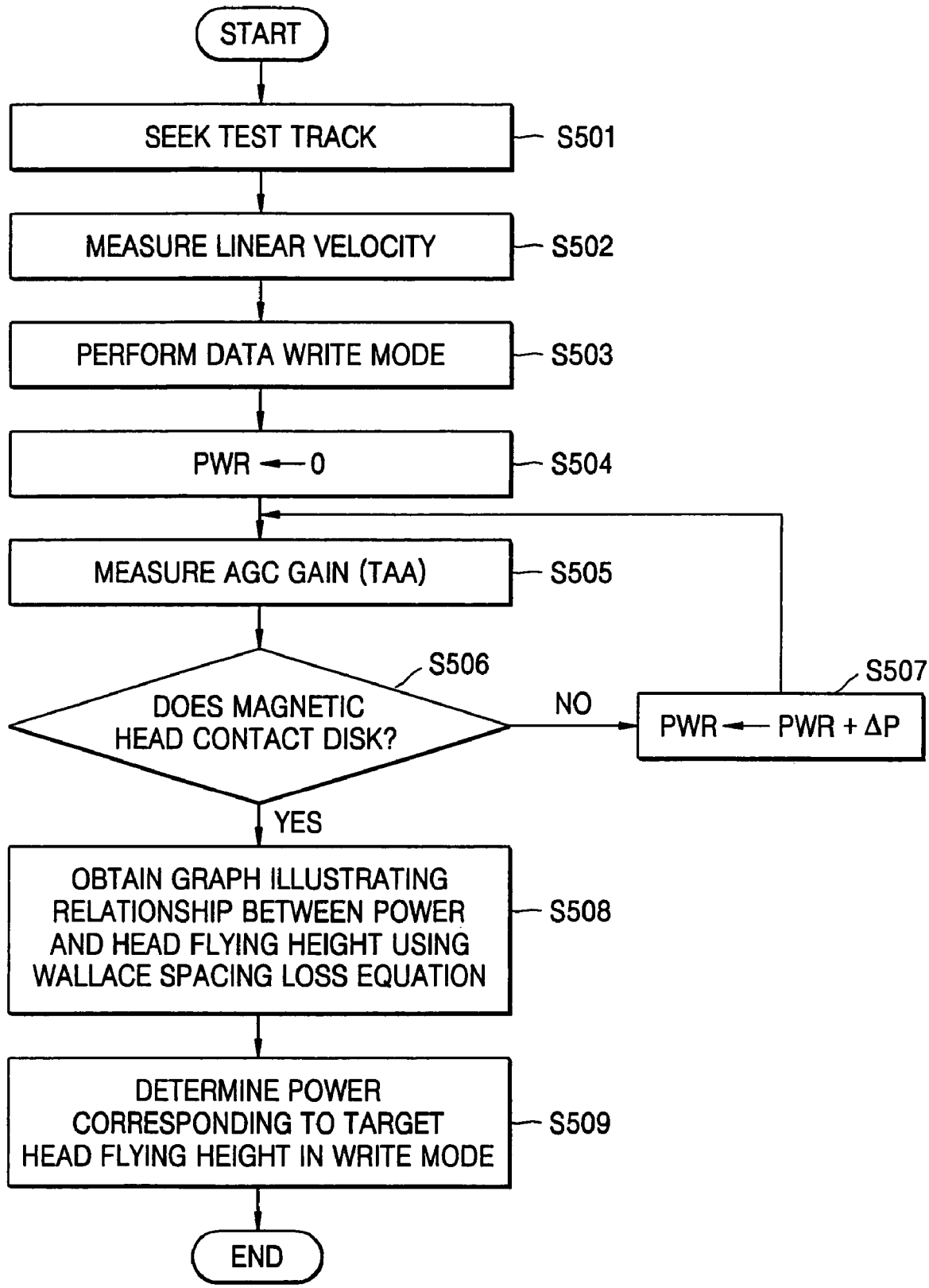
FIG. 5 is a flow chart illustrating a method of determining current supplied to the heater to control a flying height of the magnetic head in a write mode according to an embodiment of the present invention.

An embodiment of the present invention, including determining the current supplied to the heater of the magnetic head 16 to control the flying height of the magnetic head 16 in the write mode, will now be set forth with greater detail, with reference to the flow chart of FIG. 5.

The magnetic head 16 may be moved to a test track on the disk 12 under a seek control, in operation S501. A linear velocity in the test track may be measured, in operation S502. Here, the linear velocity may be obtained by calculating a time interval between detected servo sectors and dividing a servo sector interval between the servo sectors by the time interval.

If the test track in the read mode is the same as the test track in the write mode, operation S502 may be omitted and the linear velocity measured in the read mode may be used. A data write mode may then be performed in the test track, in operation S503. The heater current supply circuit 280 may set the current supplied to the heater of the magnetic head 16 to zero (0), for example, in a predetermined period of time, for example, after the data write mode is implemented such that power PWR of the heater becomes zero (0), in operation S504.

The AGC gain value of the automatic gain control circuit of the write/read channel 220 may be measured, in operation S505. Here, the gain value of the automatic gain control circuit may be a servo AGC gain value TAA set when the servo field is reproduced. Whether the magnetic head 16 contacts the disk 12 may be determined in S506. If a position error signal is detected and the level of the position error signal exceeds a threshold value, the magnetic head 16 may be considered to have contact the disk 12.

If the magnetic head 16 does not contact the disk 12, operation S507 may be performed, where the heater current supply circuit 280 increases the current supplied to the heater of the magnetic head 16 by a predetermined amount, for example, to increase the power PWR by ΔP, and may perform operation S505 again. Of course, in this case, an AGC gain may be calculated in a predetermined period of time after the power of the heater is increased.

If the magnetic head 16 contacts the disk 12, operation S508 may be performed. In operation S508, a graph illustrating a relationship between the power PWR of the heater and a flying height of the magnetic head 16 over the disk 12 may be obtained using the aforementioned Wallace spacing loss equation 1.

A graph illustrating a relationship between the power of the heater and a spacing gain corresponding to the flying height of the magnetic head in the write mode, as shown in FIG. 6, may be obtained in the same manner as described in the read mode.

The power PWR of the heater, corresponding to a target flying height of the magnetic head 16 that is similar, e.g., substantially the same, as the target flying height in the read mode, may be determined from the graph of FIG. 6, for example, and the current supplied to the heater of the magnetic head 16 in the write mode may be determined based on the determined power PWR.

Accordingly, when the heater current supply circuit 280 generates current corresponding to the current, which may be determined to be supplied to the heater of the magnetic head 16 in each of the read mode and the write mode, and then supplies the generated current to the heater, the clearance between the disk 12 and the magnetic head 16 can be controlled to be similar, e.g., substantially the same, in the read mode and the write mode.

Figure 7A:
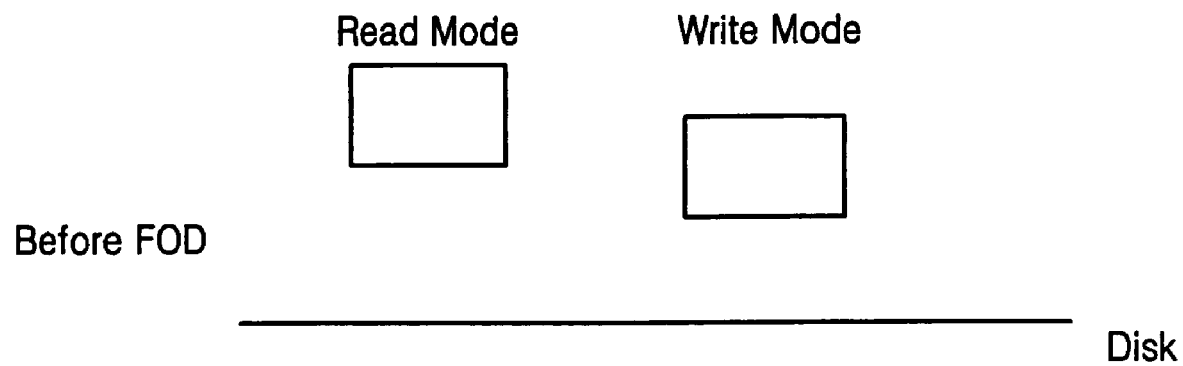
FIG. 7A illustrates a difference between the flying height of a magnetic head in a read mode and the flying height of a magnetic head in a write mode before current is supplied to a heater of a magnetic head, according to an embodiment of the present invention.
Figure 7B:
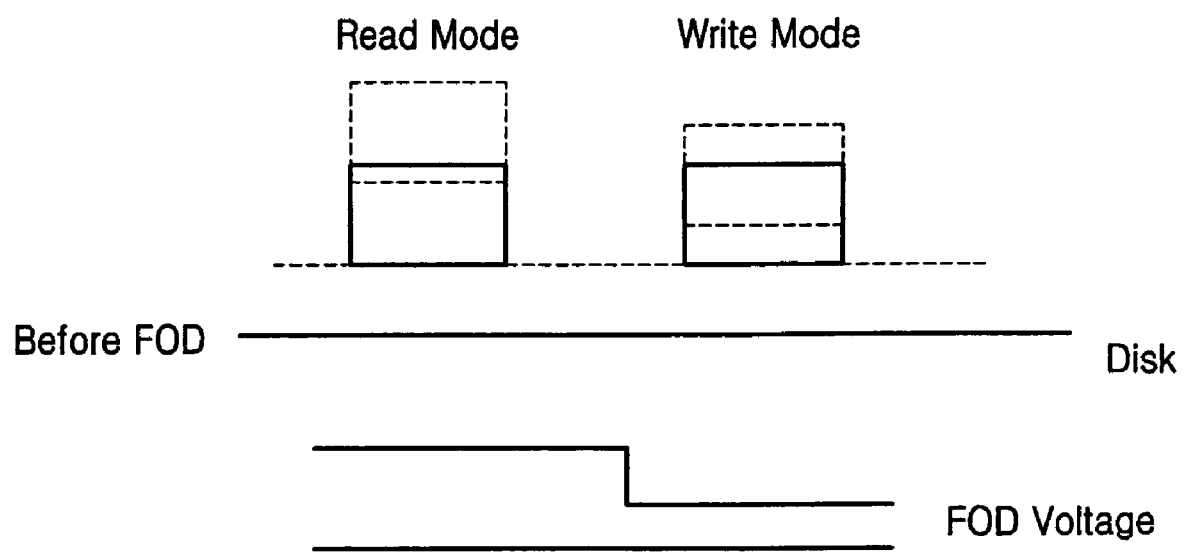
FIG. 7B illustrates the flying height of a magnetic head both in a read mode and a write mode after current is supplied to a heater of the magnetic head, according to an embodiment of the present invention.

That is, if no current is supplied to the heater of the magnetic head 16, the flying height of the magnetic head 16 over the disk 12 in the read mode may be different from that in the write mode as shown in FIG. 7A. However, if the heater current in the read mode and the write mode respectively determined by the flow charts of FIGS. 4 and 5 is generated by the heater current supply circuit 280, that is, if a flying on demand (FOD) voltage is generated, the flying height of the magnetic head 16 over the disk 12 may be similar, e.g., substantially the same, in the read mode and the write mode as shown in FIG. 7B.

As described above, since the heater is added to the magnetic head and the current supplied to the heater in each of the read mode and the write mode is designated so that the flying height of the magnetic head over the disk in the read mode can be similar, e.g., substantially the same, as that in the write mode, the servo control performance of a disk drive can be improved and an error rate during data read and write operations can be reduced.

Embodiments of the present invention may be implemented by a method, apparatus, system, etc. If embodiments are performed by computer readable code, constitutional elements of embodiments may include code segments that perform differing operations, e.g., essential operations. Computer readable code or code segments maybe be stored on a medium, e.g., processor-readable media. Examples of the media can include semiconductor memory devices, read-only memories (ROMs), erasable ROMs, floppy disks, optical disks, hard disks and optical fibre media, noting that differing embodiments are equally available.

Although a few embodiments of the present invention have been shown and described, it would be appreciated by those skilled in the art that changes may be made in these embodiments without departing from the principles and spirit of the invention, the scope of which is defined in the claims and their equivalents. In addition, embodiments of the present invention may be applied to disk drives including an HDD and to other various kinds of data storage devices.

What is claimed is:

1. An apparatus controlling a flying height of a magnetic head of a recording and/or reproducing apparatus, the apparatus comprising:
   a medium storing information;
   the magnetic head including a magnetic read element to detect a magnetic field in a portion of the medium, a magnetic write element to magnetize a portion of the medium, a structure to generate an air bearing between a surface of the medium and the magnetic read element and magnetic write element, and a heater particularly heating the structure that generates the air bearing; and
   a current supply circuit supplying current to the heater in both the write mode and the read mode, wherein the current is designated such that a clearance between the medium and the magnetic head in a write mode is substantially the same as a clearance between the medium and the magnetic head in a read mode.

2. The apparatus of claim 1, wherein the heater includes a coil.

3. The apparatus of claim 1, wherein current supplied to the heater is designated to correspond to a target clearance between the medium and the magnetic head in both the write mode and the read mode by selectively controlling the current supplied to the heater in each of the read mode and the write mode and obtaining data representing a relationship between power of the heater and a clearance between the medium and the magnetic head.

4. The apparatus of claim 3, wherein the apparatus performs a process of obtaining the data representing the relationship between the power of the heater and the clearance between the medium and the magnetic head in the read mode, and the process comprises:
   detecting a linear velocity and a recording frequency in a predetermined test track of the medium;
   performing a data read mode in the test track;
   detecting a gain value of an automatic gain control circuit with respect to a signal reproduced when current supplied to the heater is increased by a predetermined amount until the magnetic head and the medium contact each other;
   obtaining the data representing the relationship between the power of the heater and the clearance between the medium and the magnetic head based on:
   $\Delta d = (\lambda/2\pi)*Ls$, where
   $\Delta d$=variation of magnetic space between the medium and magnetic head,
   $\lambda$=recording wavelength =linear velocity/recording frequency,
   Ls =Ln (TAA1/TAA2),
   TAA1=previous automatic gain control (AGC) gain value, and
   TAA2=present AGC gain value; and
   obtaining a power from the data representing the relationship between the power of the heater and the clearance between the medium and the magnetic head, the power corresponding to a target clearance between the medium and the magnetic head and determining from the obtained power the current supplied to the heater in the read mode.

5. The apparatus of claim 4, wherein if a position error signal is detected and a level of the position error signal exceeds a predetermined threshold value, the magnetic head is determined to have contacted the medium.

6. The apparatus of claim 3, wherein the apparatus performs a process of obtaining the data representing the relationship between the power of the heater and the clearance between the medium and the magnetic head in the write mode, and the process comprises:
   detecting a linear velocity and a recording frequency in a predetermined test track of the medium;
   performing a data write mode in the test track;
   detecting a gain value of an automatic gain control circuit with respect to a signal reproduced when current supplied to the heater is increased by a predetermined amount until the magnetic head and the medium contact each other;
   obtaining the data representing the relationship between the power of the heater and the clearance between the medium and the magnetic head based on:
   $\Delta d = (\lambda/2\pi)*Ls$, where
   $\Delta d$=variation of magnetic space between the medium and magnetic head,
   $\lambda$=recording wavelength =linear velocity/recording frequency,
   Ls =Ln (TAA1/TAA2),
   TAA1=previous automatic gain control (AGC) gain value, and
   TAA2=present AGC gain value; and
   obtaining a power from the data representing the relationship between the power of the heater and the clearance between the medium and the magnetic head, the power corresponding to a target clearance between the medium and the magnetic head and determining from the obtained power the current supplied to the heater in the write mode.

7. The apparatus of claim 6, wherein if a position error signal is detected and a level of the position error signal exceeds a predetermined threshold value, the magnetic head is determined to have contacted the medium.

8. The apparatus of claim 1, wherein the apparatus controlling the flying height of the magnetic head is the recording and/or reproducing apparatus, further comprising a spindle motor to rotate the medium, and the recording and/or reproducing apparatus is a hard disk drive.

9. A method of controlling a flying height of a magnetic head, the magnetic head including a heater, the method comprising:
- obtaining data representing a relationship between power of the heater and a clearance between a medium and the magnetic head by varying current supplied to the heater in each of a write mode and a read mode of the magnetic head; and
- determining, from the data representing the relationship, current to be supplied to the heater in the write mode and current supplied to the heater in the read mode, both supplied currents corresponding to a target clearance between the medium and the magnetic head.

10. The method of claim 9, wherein the obtaining of the data representing the relationship between the power of the heater and the clearance between the medium and the magnetic head in the read mode comprises:
- detecting a linear velocity and a recording frequency in a predetermined test track of the medium;
- performing a data read mode in the test track;
- detecting a gain value of an automatic gain control circuit with respect to a signal reproduced when current supplied to the heater is increased by a predetermined amount until the magnetic head and the medium contact each other; and
- obtaining data representing the relationship between the power of the heater and the clearance between tile medium and the magnetic head based on:

$\Delta d=(\lambda/2\pi)*Ls$, where $\Delta d$=variation of magnetic space between the medium and magnetic head, $\lambda$=recording wavelength =linear velocity/recording frequency, $Ls = Ln(TAA1/TAA2)$, $TAA1$=previous (AGC) gain value, and $TAA2$=present AGC gain value.

11. The method of claim 10, wherein if a position error signal is monitored and a level of the position error signal exceeds a predetermined threshold value, the magnetic head is determined to have contacted the medium.

12. The method of claim 9, wherein the obtaining of the data representing the relationship between the power of the heater and the clearance between the medium and the magnetic head in the write mode comprises:
- detecting a linear velocity and a recording frequency in a predetermined test track of the medium;
- performing a data write mode in the test track;
- detecting a gain value of an automatic gain control circuit with respect to a signal reproduced when current supplied to the heater is increased by a predetermined amount until the magnetic head and the medium contact each other
- obtaining the data representing the relationship between the power of the heater and the clearance between the medium and the magnetic head based on:

$\Delta d=(\lambda/2\pi)*Ls$, where $\Delta d$=variation of magnetic space between the medium and magnetic head, $\lambda$=recording wavelength =linear velocity/recording frequency, $Ls = Ln(TAA1/TAA2)$, $TAA1$=previous (AGC) gain value, and $TAA2$=present AGC gain value; and

- obtaining a power from data representing the relationship between the power of the heater and the clearance between the medium and the magnetic head, the power corresponding to a target clearance between the medium and the magnetic head and determining from the obtained power the current supplied to the heater in the write mode.

13. The method of claim 12, wherein if a position error signal is monitored and a level of the position error signal exceeds a predetermined threshold value, the magnetic head is determined to have contacted the medium.

14. The method of claim 9, wherein the medium is a disk of a hard disk drive.

15. At least one medium comprising computer readable code to implement the method of claim 9.

16. At least one medium comprising computer readable code to implement the method of claim 10.

17. At least one medium comprising computer readable code to implement the method of claim 12.

* * * * *

UNITED STATES PATENT AND TRADEMARK OFFICE
CERTIFICATE OF CORRECTION

PATENT NO. : 7,649,706 B2 Page 1 of 1
APPLICATION NO. : 11/317012
DATED : January 19, 2010
INVENTOR(S) : Won-choul Yang It is certified that error appears in the above-identified patent and that said Letters Patent is hereby corrected as shown below:

Column 11, Line 40, change "tile" to --the--.

Column 11, Line 48, change "(AGC)" to --AGC--.

Column 12, Line 16, after "other" insert --;--.

Column 12, Line 26, change "(AGC)" to --AGC--.

Signed and Sealed this

Eleventh Day of May, 2010

David J. Kappos
*Director of the United States Patent and Trademark Office*